US008763760B2

(12) United States Patent
Stolt et al.

(10) Patent No.: US 8,763,760 B2
(45) Date of Patent: Jul. 1, 2014

(54) ADJUSTMENT DEVICE FOR CONTROLLING ELECTRIC DRIVE OF AN ELEVATOR, ELECTRIC DRIVE OF AN ELEVATOR AND METHOD FOR CONTROLLING ELECTRIC DRIVE OF AN ELEVATOR

(75) Inventors: Lauri Stolt, Helsinki (FI); Antti Kallioniemi, Tuusula (FI); Tuukka Kauppinen, Suzhou (CN)

(73) Assignee: Kone Corporation, Helsinki (FI)

( * ) Notice: Subject to any disclaimer, the term of this patent is extended or adjusted under 35 U.S.C. 154(b) by 0 days.

(21) Appl. No.: 13/608,502

(22) Filed: Sep. 10, 2012

(65) Prior Publication Data
US 2013/0015021 A1    Jan. 17, 2013

Related U.S. Application Data

(63) Continuation of application No. PCT/FI2011/000019, filed on Apr. 7, 2011.

(30) Foreign Application Priority Data

Apr. 7, 2010 (FI) ...................................... 20105356

(51) Int. Cl.
 *B66B 1/28* (2006.01)
(52) U.S. Cl.
 USPC .......................................... 187/293; 187/393
(58) Field of Classification Search
 USPC ................ 187/247, 290, 293, 295, 296, 297, 187/391–393; 318/66, 68, 268, 434; 361/33, 56, 91.1
See application file for complete search history.

(56) References Cited

U.S. PATENT DOCUMENTS

| | | | | |
|---|---|---|---|---|
| 3,599,755 A * | 8/1971 | Lund et al. | | 187/293 |
| 3,851,735 A * | 12/1974 | Winkler et al. | | 187/380 |
| 3,961,688 A * | 6/1976 | Maynard | | 187/289 |
| 4,240,527 A * | 12/1980 | Vine | | 187/387 |
| 5,070,290 A | 12/1991 | Iwasa et al. | | |
| 5,229,558 A | 7/1993 | Hakala | | |
| 5,894,910 A | 4/1999 | Suur-Askola et al. | | |
| 5,929,400 A * | 7/1999 | Colby et al. | | 187/393 |
| 6,315,081 B1 * | 11/2001 | Yeo | | 187/290 |
| 7,882,937 B2 * | 2/2011 | Okada | | 187/296 |
| 7,931,128 B2 * | 4/2011 | Sakai et al. | | 187/293 |
| 8,177,032 B2 * | 5/2012 | Hashimoto | | 187/290 |
| 2009/0301819 A1 | 12/2009 | Agirman et al. | | |
| 2010/0187046 A1 * | 7/2010 | Stolt et al. | | 187/293 |
| 2012/0217098 A1 * | 8/2012 | Putkinen et al. | | 187/293 |

FOREIGN PATENT DOCUMENTS

| | | |
|---|---|---|
| GB | 2 168 829 A | 6/1986 |
| WO | WO 96/17798 A1 | 6/1996 |
| WO | WO 2009/043965 A1 | 4/2009 |

* cited by examiner

*Primary Examiner* — Anthony Salata
(74) *Attorney, Agent, or Firm* — Birch, Stewart Kolasch & Birch, LLP

(57) ABSTRACT

An adjustment device for controlling the electric drive of an elevator in connection with a voltage reduction of the supplying network is disclosed. The electric drive of an elevator includes an electric motor and a power supply apparatus of for adjusting the supply voltage of the electric motor. The adjustment device includes a device configured to control the power supply apparatus and also a speed regulator for adjusting the speed of the electric motor. The adjustment device is arranged to determine the output voltage of the power supply apparatus of the electric motor in relation to the permitted maximum value of the output voltage, and the adjustment device is arranged to interrupt the operation of the speed regulator but to continue the operation of the power supply apparatus of the electric motor when the output voltage of the power supply apparatus of the electric motor reaches the permitted maximum value.

20 Claims, 5 Drawing Sheets

1: Adjustment Device
3: Motor
4: Frequency Converter
23: Elevator Car
25: Elevator Control Unit
26: Pulse Encoder
30: Network

ADJUSTMENT DEVICE FOR CONTROLLING ELECTRIC DRIVE OF AN ELEVATOR, ELECTRIC DRIVE OF AN ELEVATOR AND METHOD FOR CONTROLLING ELECTRIC DRIVE OF AN ELEVATOR

This application is a Continuation of PCT/FI2011/000019 filed on Apr. 7, 2011, which claims priority under 35 U.S.C. §119(a) to Patent Application No. 20105356 filed in Finland on Apr. 7, 2010. The entire contents of each of the above documents is hereby incorporated by reference into the present application.

FIELD OF THE INVENTION

The invention relates to devices and methods for controlling the operation of the electric drive of an elevator.

BACKGROUND OF THE INVENTION

The source voltage produced by the rotor excitation of an elevator motor depends on the speed of rotation of the rotor. When the speed of rotation of the rotor and thereby the source voltage increases, the magnitude of the needed supply voltage of the motor also increases. The magnitude of the needed supply voltage of the motor is also affected by e.g. the motor current. Since the largest possible supply voltage of the motor is determined on the basis of the maximum output voltage of the power supply apparatus, such as of the frequency converter, of the motor, the permitted speed range of the motor must be limited such that the supply voltage required by the motor does not exceed the maximum output voltage of the power supply apparatus of the motor. Particularly in lower-powered systems, a frequency converter is usually used as the power supply apparatus of the motor, the intermediate circuit voltage of which frequency converter is unregulated and is determined directly on the basis of the voltage of the electricity network supplying the frequency converter. Since the intermediate circuit voltage, on the other hand, sets the largest possible output voltage of the frequency converter, e.g. a momentary voltage reduction occurring in the electricity network supplying the frequency converter has the effect that the output voltage of the frequency converter decreases. For this reason the rated speed of the elevator and the corresponding maximum speed of rotation of the electric motor during normal operation are usually selected such that at the rated speed and with the rated load a voltage margin remains between the output voltage of the frequency converter and the supply voltage of the motor, which margin allows e.g. a 15 percent voltage reduction in the voltage of the electricity network supplying the frequency converter. A voltage reduction in the electricity network supplying the frequency converter can be caused e.g. by a voltage reduction or electricity outage occurring in the public electricity network. Also, e.g. in connection with acceleration of the elevator. the large instantaneous current taken by the electric motor might cause a momentary voltage reduction in the supplying electricity network. The voltage endurance of the solid-state switches of the power supply apparatus of the motor also limits the maximum output voltage in those power supply apparatuses in which the intermediate circuit voltage can be regulated.

Since the speed of the elevator affects e.g. the transport capacity of the elevator system as well as the door-to-door time, within the framework of which a passenger can be moved from the departure floor to the destination floor, it would be advantageous to select the speed of rotation of the elevator motor to be as close as possible to the value set by the maximum output voltage of the power supply apparatus. In this case when the speed of rotation is increased, however, a problem forms in that repetitive voltage reductions/electricity outages might cause unnecessarily many breaks in the operation of the elevator.

In some cases it would be advantageous to increase the speed of the elevator car to be even higher than the rated speed in situations in which the net load of the elevator, i.e. the force difference acting in the elevator ropes on opposite sides of the traction sheave, is smaller than the rated load. Also in this case operating breaks of the elevator caused by voltage reductions/electricity outages might form a problem.

SUMMARY OF THE INVENTION

The aim of the invention is to disclose an adjustment device for regulating the operation of the electric drive of an elevator, using which device it is possible to drive the elevator with the electric drive of the elevator closer to the upper limit set by the maximum output voltage of the power supply apparatus of the motor than in prior art such that a run with the elevator continues also during a momentary voltage reduction of the electricity network supplying the power supply apparatus of the motor. To achieve this aim the invention discloses an adjustment device, an electric drive and, also a method for controlling the electric drive of an elevator. The preferred embodiments of the invention are described in the non-independent claims.

With regard to the first aspect, the invention relates to an adjustment device in connection with an electric drive of an elevator. The electric drive of the elevator comprises an electric motor. The electric drive of the elevator further comprises a power supply apparatus of the electric motor for adjusting the supply voltage of the electric motor. The adjustment device according to the invention comprises means for controlling the power supply apparatus of the electric motor as well as a speed regulator for adjusting the speed of the electric motor. The adjustment device is arranged to determine the output voltage of the power supply apparatus of the electric motor in relation to the permitted maximum value of the output voltage, and the adjustment device is arranged to interrupt the operation of the speed regulator but to continue the operation of the power supply apparatus of the electric motor when the output voltage of the power supply apparatus of the electric motor reaches the permitted maximum value.

In a preferred embodiment of the invention the adjustment device is arranged to continue the interrupted operation of the speed regulator when the difference between the output voltage of the power supply apparatus of the electric motor and the permitted maximum value of the output voltage returns to be at least the magnitude of the required limit value.

In a preferred embodiment of the invention the power supply apparatus of the electric motor comprises a motor bridge, which comprises controllable solid-state switches, which are switched in response to the voltage reference of the motor bridge. The adjustment device is arranged to determine the output voltage of the power supply apparatus of the electric motor in relation to the permitted maximum value of the output voltage preferably on the basis of the voltage reference of the motor bridge of the power supply apparatus of the electric motor. The adjustment device is in this case arranged to preferably interrupt the operation of the speed regulator but to continue the operation of the power supply apparatus of the electric motor when the voltage reference of the motor bridge of the power supply apparatus of the electric motor reaches the permitted maximum value. In a preferred embodiment of the invention the adjustment device is arranged, after the operation of the speed regulator has been interrupted, to limit the length of the phasor of the voltage reference vector of the motor bridge of the power supply apparatus of the electric motor to the value for the length of the phasor set by the permitted maximum value of the voltage reference of the motor bridge of the power supply apparatus of the electric motor. The adjustment device is further preferably arranged to continue the interrupted operation of the speed regulator when the difference between the voltage reference of the motor bridge of the power supply apparatus of the electric motor and the permitted maximum value of the voltage reference returns to be at least the magnitude of the required limit value. The aforementioned permitted maximum value of the voltage reference is preferably determined on the basis of the maximum value of the modulator comparator of the adjustment device.

In a preferred embodiment of the invention the speed regulator is arranged to adjust the speed of the electric motor towards the value of the speed reference, and the adjustment device is arranged to set the initial value of the speed reference to correspond to the speed of the electric motor when the interrupted operation of the speed regulator continues.

In a preferred embodiment of the invention the adjustment device is arranged to keep the value of at least one adjustment parameter of the power supply apparatus of the electric motor constant after the operation of the speed regulator has been interrupted. The aforementioned adjustment parameter of the power supply apparatus of the electric motor to be held constant can be e.g. the current reference of the voltage regulator of the adjustment device and/or the voltage reference of the voltage regulator of the adjustment device.

In one embodiment of the invention the adjustment device is arranged to set the aformentioned adjustment parameter of the power supply apparatus of the electric motor, which parameter is to be held constant after the operation of the speed regulator has been interrupted, to correspond to the value of the adjustment parameter in question when the operation of the speed regulator is interrupted.

In one embodiment of the invention the adjustment device is arranged to adjust the current of the electric motor towards the value of the current reference for adjusting the torque of the electric motor.

With regard to the second aspect, the invention relates to an electric drive of an elevator, which electric drive comprises a hoisting machine, which hoisting machine comprises an electric motor. The electric drive of the elevator also comprises a power supply apparatus of the electric motor as well as an adjustment device of the type disclosed above for controlling the electric drive of the elevator. The electric drive of the elevator is arranged to continue the current supply occurring to the electric motor with the power supply apparatus of the electric motor when the output voltage of the power supply apparatus of the electric motor reaches the permitted maximum value.

The power supply apparatus of the electric motor according to the invention is preferably a frequency converter and the electric motor according to the invention is preferably a permanent-magnet synchronous motor.

In a preferred embodiment of the invention the adjustment device is arranged to interrupt the speed regulator but to continue the current supply to the stator of the electric motor when the output voltage of the power supply apparatus of the electric motor reaches the permitted maximum value.

In the method according to the invention for controlling the electric drive of an elevator: the output voltage of the power supply apparatus of the electric motor in relation to the permitted maximum value of the output voltage is determined, and also the operation of the speed regulator is interrupted but the operation of the power supply apparatus of the electric motor is continued when the output voltage of the power supply apparatus reaches the permitted maximum value.

The invention enables a run with the elevator to be continued despite a voltage reduction or electricity outage occurring in the supplying electricity network. In this case the speed of the electric motor of the hoisting machine of the elevator, and thereby of the elevator car, can also be increased to be closer to the maximum value of speed set by the output voltage of the power supply apparatus of the electric motor than in prior art.

The aforementioned summary, as well as the additional features and advantages of the invention presented below, will be better understood by the aid of the following description of some embodiments, said description not limiting the scope of application of the invention.

MORE DETAILED DESCRIPTION OF PREFERRED EMBODIMENTS OF THE INVENTION

Figure 1:
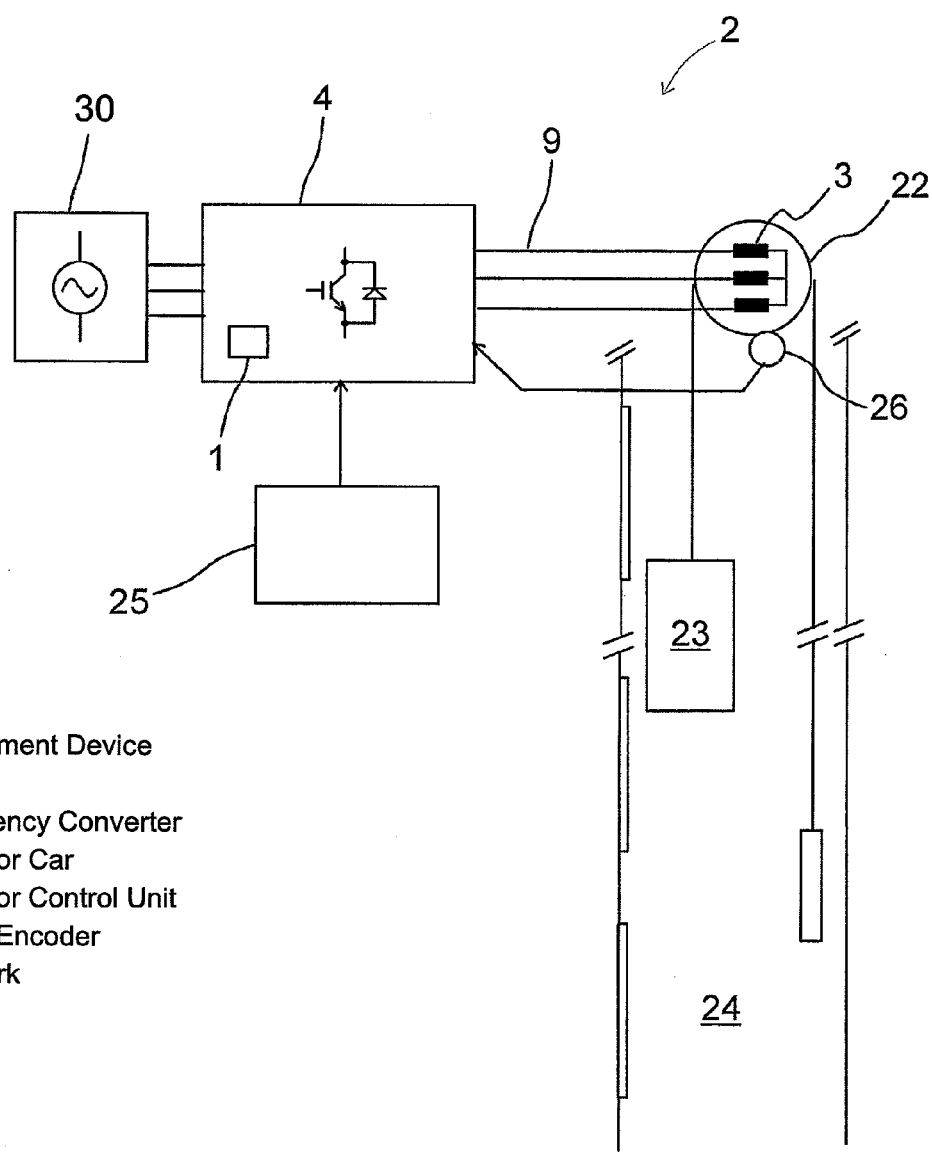
FIG. 1 presents an elevator system according to the invention, as a block diagram

FIG. 1 presents an elevator system, which comprises an electric drive 2 for moving the elevator car 23 in the elevator hoistway 24 according to the speed reference formed by the elevator control unit 25. The electric drive 2 comprises a hoisting machine 22, which comprises an alternating current motor 3 as the power producing part. Additionally, the electric drive 2 comprises a frequency converter 4 for supplying variable-amplitude and variable-frequency output voltage to the alternating current motor 3.

The elevator car 23 is suspended in the elevator hoistway 24 with ropes, a belt or corresponding passing via the traction sheave of the hoisting machine 22. The hoisting machine 22 is, in this embodiment of the invention, fixed to the guide rail (not in figure) of the elevator car, in a space between the guide rail and the wall of the elevator hoistway 24. The hoisting machine 22 could, however, also be fixed e.g. to a special machine bedplate, and the hoisting machine could also be disposed in a machine room instead of in the elevator hoistway.

The frequency converter 4 comprises an adjustment device 1 for controlling the electric drive 2 of the elevator. The adjustment device 1 is fitted in connection with the control grids of the controllable IGBT transistors of the motor bridge of the frequency converter 4 and the adjustment device 1 comprises means for controlling the power supply apparatus 4 of the electric motor by switching the IGBT transistors of the motor bridge with switching pulses, the frequency of which is essentially higher than the frequency of the fundamental frequency of the output voltage of the frequency converter.

The adjustment device 1 also comprises a speed regulator, by means of which the speed of the electric motor 3 and thus also of the elevator car 23 is adjusted towards the speed reference formed by the elevator control unit 25. The speed reference is sent to the speed regulator via a data transfer bus between the frequency converter 4 and the elevator control unit 25. The frequency converter 4 also comprises an input for the measuring signal of the speed of rotation of the rotor of the electric motor 3. The speed of rotation of the rotor is measured with a pulse encoder 26 to be connected to the traction sheave of the hoisting machine 22.

Figure 2:
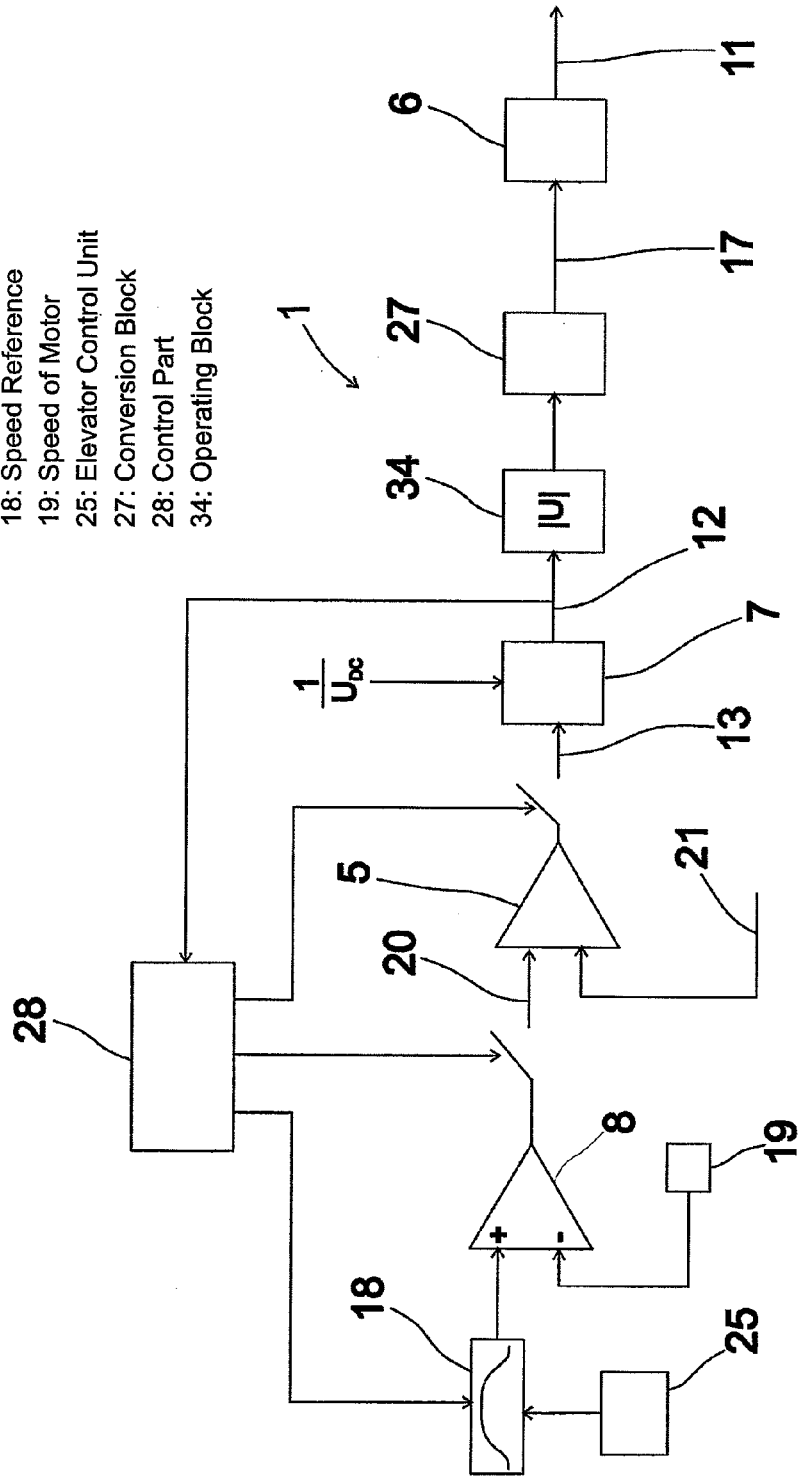
FIG. 2 presents an adjustment device according to the invention, as a functional diagram

FIG. 2 describes in more detail the operation of an adjustment device 1 suited to be used e.g. in the embodiment of FIG. 1. The adjustment device 1 is arranged to determine the output voltage 9 of the power supply apparatus of the electric motor in relation to the permitted maximum value of the output voltage. The adjustment device 1 is arranged to interrupt the operation of the speed regulator 8 but to continue the run with the elevator by supplying current with the frequency converter 4 to the stator of the electric motor 3 when the output voltage 9 of the frequency converter 4 reaches the permitted maximum value 10. Additionally, the adjustment device 1 is further arranged to continue the interrupted operation of the speed regulator 8 when the difference 15 between the output voltage 9 of the power supply apparatus of the electric motor and the permitted maximum value of the output voltage returns to be at least the magnitude of the required limit value. The speed regulator 1 is arranged to set the initial value of the speed reference 18 to correspond to the speed 19 of the electric motor, when the interrupted operation of the speed regulator continues.

The adjustment device 1 comprises a cascade regulator, which comprises a current regulator 5 in addition to a speed regulator 8. The speed regulator 8 compares with the pulse encoder 26 the measured speed 19 of the electric motor 3 to the speed reference 18 formed by the elevator control unit 25 and also calculates, on the basis of the comparison, the torque reference 20 in response to which the torque of the electric motor 3 is adjusted such that the speed 19 of the electric motor approaches the speed reference 18. The speed reference could also be formed directly in the adjustment device 1, instead of the elevator control unit 25, using the computing capacity of the frequency converter 4 in the calculation of the speed reference 18. The torque of the electric motor 3 is here directly proportional to the stator current of the electric motor 3, so that the torque reference 20 is used as a current reference of the current regulator 5. The current regulator 5 adjusts the stator current 21 in an auxiliary d,q coordinate system rotating along with the rotor of the electric motor, in which system the d axis is in the direction of the excitation axis of the electric motor and the q axis is in the direction of the torque axis of the electric motor. The current reference 20 therefore forms a reference for the stator current in the direction of the q axis.

Figure 3:
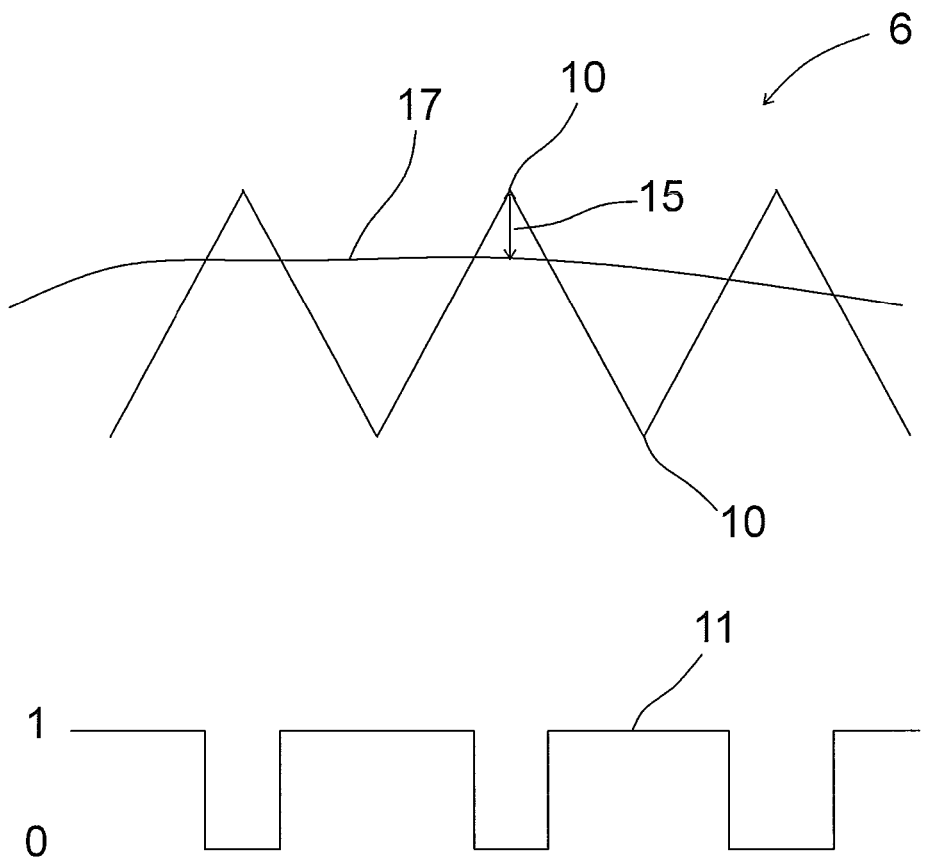
FIG. 3 illustrates the operation of a pulse width modulator
Figure 5:
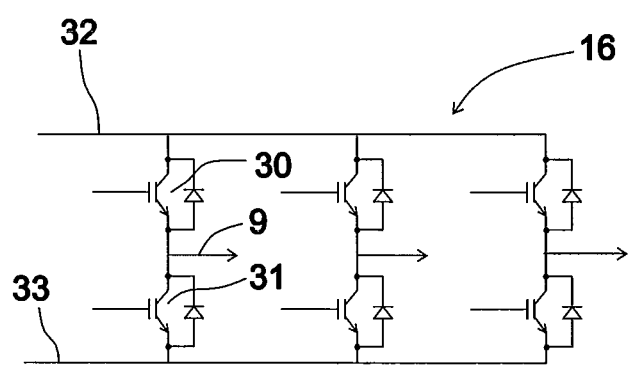
FIG. 5 presents a motor bridge of a frequency converter according to the invention

The voltage reference 12 is obtained as the output of the current regulator 5 for the motor bridge of the frequency converter 4. One possible motor bridge 16 of the frequency converter 4 is presented in FIG. 5. The voltage reference 12 is first converted from the d,q coordinate system into the three-phase stator coordinate system in conversion block 27, and the three-phase voltage references 17 of the motor bridge of the frequency converter 4 that are converted into the stator coordinate system are taken to the pulse-width modulator 6, by means of which switching references are formed for the IGBT transistors of the motor bridge of the frequency converter 4. The operation of one such possible pulse width modulator 6 is presented in FIG. 3 in respect of one phase.

The pulse width modulator 6 comprises a modulator comparator, which compares for each specific phase the value of the three-phase voltage references 17 of the motor bridge of the frequency converter 4 to the value of the saw-tooth generator of the modulator comparator. When the value of the phase voltage reference 17 is greater than or equal to the value of the saw-tooth generator, the modulator comparator forms a value 1 of the switching reference 11 for the IGBT transistors 30, 31 of the phase in question of the motor bridge of the frequency converter, according to which value 1 the IGBT transistor 30 of the top branch is controlled into a conductive state and the current flow through the IGBT transistor 31 of the bottom branch is disconnected. In this case the instantaneous output voltage 9 of the frequency converter corresponds to the positive voltage 32 of the DC intermediate circuit. When the value of the phase voltage reference 17, on the other hand, falls below the value of the saw-tooth generator, the modulator comparator forms a value 0 of the switching reference 11 for the IGBT transistors 30, 31 of the phase in question of the motor bridge of the frequency converter, according to which value 0 the current flow through the IGBT transistor 30 of the top branch is disconnected and the IGBT transistor 31 of the bottom branch is controlled into a conductive state. In this case the instantaneous output voltage 9 of the frequency converter corresponds to the negative voltage 33 of the DC intermediate circuit. On the basis of what is presented above, it can be observed that the maximum value 10 of the saw-tooth generator determines the permitted maximum value of the voltage reference 17 of the motor bridge and thereby also the permitted maximum value of the output voltage 9 of the power supply apparatus, because when the absolute value of the voltage reference of the motor bridge exceeds the maximum value 10 of the saw-tooth generator the modulator comparator becomes saturated and the IGBT transistors 30, 31 of the motor bridge no longer switch at the switching frequency set by the saw-tooth generator. When the modulator comparator becomes saturated, also the output voltage 9 of the motor bridge of the frequency converter distorts, which would cause vibration in the electric motor 3. To avoid this problem the length of the phasor of the voltage reference vector of the motor bridge is limited to the value of the length of the phasor set by the maximum value 10 of the saw-tooth generator in operating block 34. In practice this is done by determining the length |U| of the phasor of the voltage reference 12 in the auxiliary d;q coordinate system $U_d$, $U_q$ from the equation:

$$|U|=\sqrt{U_d^2+U_q^2}$$

and also by determining that the value of the length |U| of the phasor never exceeds the aforementioned maximum value 10 of the saw-tooth generator. In a preferred embodiment of the invention this is done by limiting only the voltage reference component $U_q$ in the direction of the torque axis q and by letting the voltage reference component $U_d$ in the direction of the excitation axis change freely, in which case the phasor of the voltage reference is able to rotate.

The software of the adjustment device 1 comprises a control part 28, which reads the value of the voltage reference 12 of the motor bridge of the frequency converter 4 and interrupts the operation of the speed regulator 8 if the value of the voltage reference 12 of the motor bridge reaches or exceeds the maximum value 10 according to the saw-tooth generator of the modulator comparator. In a first preferred embodiment of the invention the operation of the current regulator 5 continues despite the interruption of the operation of the speed regulator. In this case when the operation of the speed regulator is interrupted the control part 28 sets for the current reference 20 of the current regulator 5 the value that current reference has at the moment of interruption of the operation of the speed regulator 8. The value 20 of the current reference is kept constant after interruption of the operation of the speed regulator 8. In this case the run with the elevator continues without the speed regulator 8 despite the restriction of the output voltage of the frequency converter 4.

Figure 4:
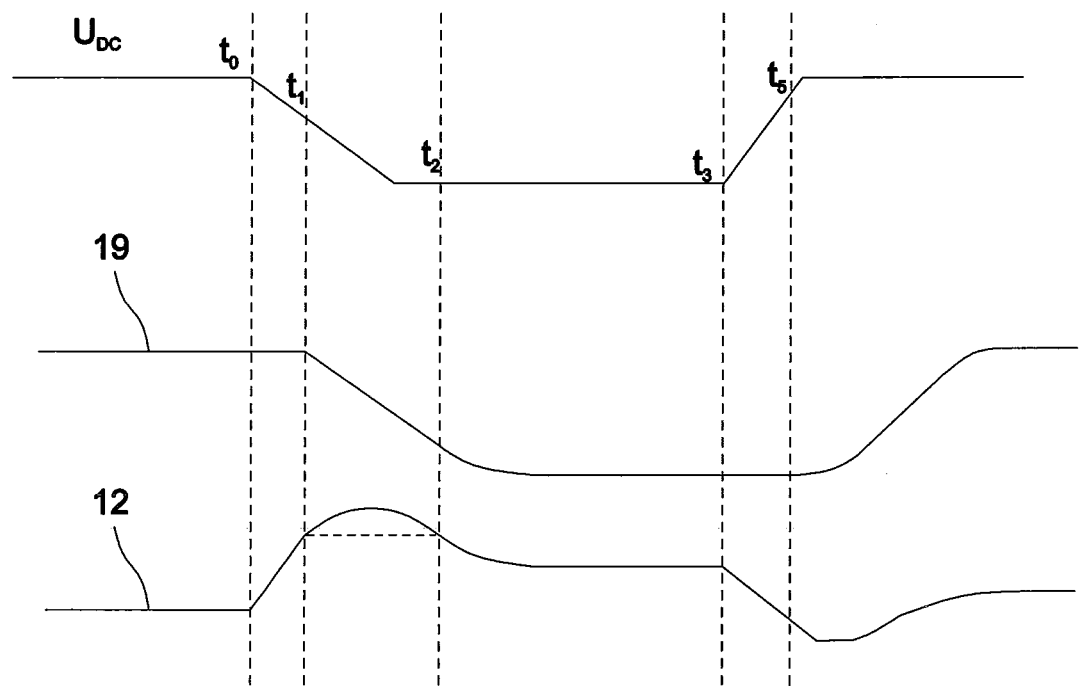
FIG. 4 presents the operation according to a first embodiment of the invention of an electric drive of an elevator according to the invention in connection with a voltage reduction of the electricity network supplying the power supply apparatus of the motor

FIG. 4 presents in more detail the operation of an electric drive 2 according to a first embodiment of the invention when the output voltage of the frequency converter 4 is limited when using the adjustment device 1 described above. In this case the elevator drives in the heavy direction such that the force effect of the electric motor of the hoisting machine is parallel with the direction of movement of the suspension ropes that are on the traction sheave of the hoisting machine. The output voltage of the frequency converter is not generally limited when the elevator drives in the light direction, because in this case the electric power returns owing to motor braking from the electric motor to the direct-current intermediate circuit of the frequency converter 4, and the voltage in the direct-current intermediate circuit of the frequency converter 4 tries to increase irrespective of the voltage of the supplying electricity network 30. In FIG. 4 at the time $t_0$ the value $U_{DC}$ of the intermediate circuit voltage starts to decrease owing to the voltage reduction of the supplying electricity network. At the same time the value 12 of the voltage reference of the motor bridge in relation to the maximum value 10 of the saw-tooth generator of the modulator comparator starts to increase. This is because the current regulator 5 endeavors to keep the output voltage 9 of the frequency converter the same as it was before. At the time $t_1$ the voltage reference 12 of the motor bridge reaches the aforementioned maximum value 10 of the saw-tooth generator, and the length |U| (horizontal dashed line) of the phasor of the voltage reference of the motor bridge is limited to the maximum value of the saw-tooth generator. In this case the stator current of the electric motor and at the same time the torque produced by the electric motor start to decrease; when the torque decreases, the speed 19 of the electric motor also starts to fall. When the speed of the electric motor falls, the source voltage of the rotor and thereby the supply voltage required by the electric motor also decreases. At the time $t_2$ when the speed of the electric motor falls, the supply voltage required by the electric motor decreases to below the maximum output voltage 9 of the frequency converter, in which case the voltage reference 12 of the motor bridge of the frequency converter decreases again to slightly below the permitted maximum value 10 of the voltage reference determined by the saw-tooth generator of the modulator comparator, and the value of the motor current adjusts to the value according to the current reference of the current regulator 5. In this embodiment of the invention the control part 28 of the adjustment device 1 continues the interrupted operation of the speed regulator 8 immediately when the voltage reference decreases to slightly below the aforementioned permitted maximum value 10 of the voltage reference. The control part 28 sets, as the initial value of the speed reference, the value of the measured speed 19 of the electric motor at that moment, in which case the operation of the speed regulator 8 continues. With this it can be ensured that restarting of the speed regulator 8 does not produce an extra torque shock in the motor 3. The control part 28 calculates the speed reference 18 from the initial value of the speed reference onwards with a certain jerk such that the speed of the motor, and thereby of the elevator car, returns softly back to the phase of even speed. After this the movement of the motor, and thereby of the elevator car, continues under speed regulation at an even reduced speed. At the time $t_3$ the voltage reduction of the supplying network starts to disappear, in which case the intermediate circuit voltage $U_{DC}$ starts to increase and the value of the voltage reference of the motor bridge of the frequency converter starts to decrease. This is because the same output voltage 9 of the frequency converter can now be achieved with a smaller value of the voltage reference 12. At the time $t_5$ the value of the voltage reference 12 of the motor bridge of the frequency converter has decreased to sufficiently below the permitted maximum value 10 of the voltage reference determined by the saw-tooth generator of the modulator comparator, in which case the speed of the electric motor, and thereby of the elevator car, can be increased back to the normal speed by increasing the value of the speed reference 18.

Figure 6:
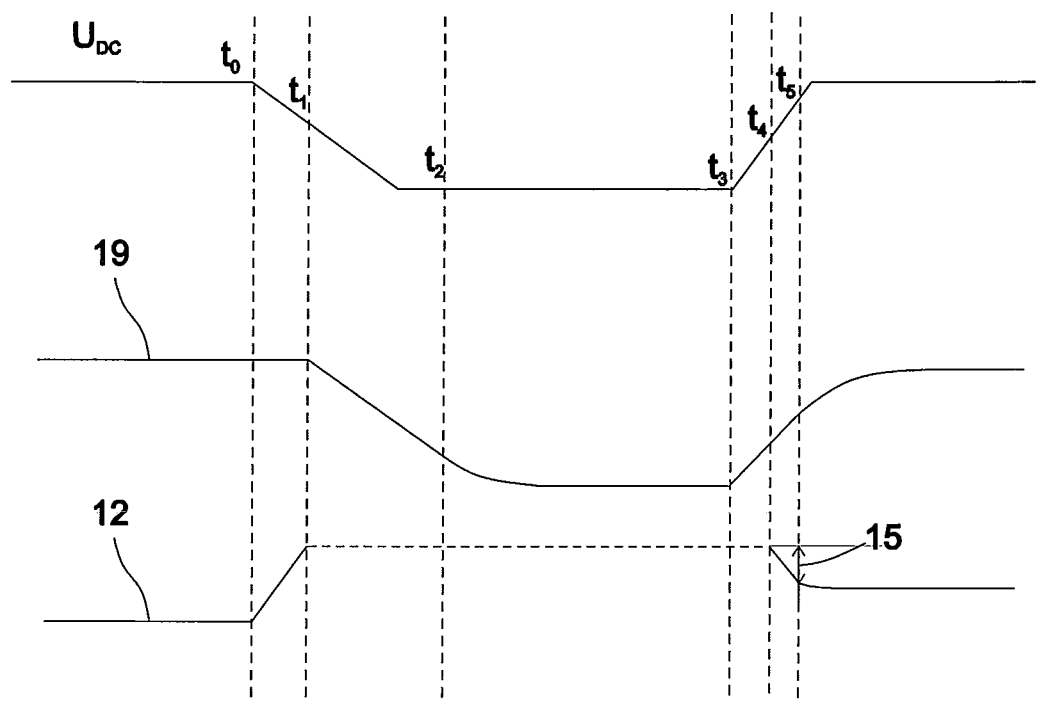
FIG. 6 presents the operation according to a second embodiment of the invention of an electric drive of an elevator according to the invention in connection with a voltage reduction of the electricity network supplying the power supply apparatus of the motor

FIG. 6 presents in more detail the operation of an electric drive 2 according to a second embodiment of the invention when the output voltage of the frequency converter 4 is limited when using the adjustment device 1 described above. In the embodiment of the invention the adjustment device 1 also comprises a voltage regulator 7, by means of which the output voltage 9 of the frequency converter is adjusted by adjusting the voltage reference 12 of the motor bridge of the frequency converter as a response to the measured intermediate circuit voltage $U_{DC}$ of the frequency converter as well as to the voltage reference 13 of the voltage regulator. The voltage reference 13 of the voltage regulator is obtained as the output of the current regulator 5. The measurement of the intermediate circuit voltage $U_{DC}$ has an inversely proportional effect in the voltage regulator 7 such that the voltage reference 12 of the motor bridge of the frequency converter increases when the intermediate circuit voltage $U_{DC}$ decreases and decreases when the intermediate circuit voltage $U_{DC}$ increases. In other words, the effect of the voltage reduction of the supplying electricity network on the output voltage 9 of the frequency converter can be compensated by means of the voltage regulator 7. In this embodiment of the invention the control part 28 of the adjustment device 1 reads the value of the voltage reference 12 of the motor bridge of the frequency converter 4 and interrupts the operation of both the speed regulator 8 and the current regulator 5 at the time $t_1$, when the voltage reference 12 of the motor bridge reaches and goes on to exceed the maximum value 10 according to the saw-tooth generator of the modulator comparator. The operation of the voltage regulator 7 continues despite the interruption of the operation of the speed regulator 8 and of the current regulator 5. In this case the control part 28 sets for the voltage reference 13 of the voltage regulator 7 the value that the voltage reference has at the moment of interruption of the operation of the speed regulator 8 and of the current regulator 5. The value 13 of the voltage reference is kept constant after interruption of the operation of the speed regulator 8 and of the current regulator 5. In this case the run with the elevator continues without the speed regulator 8 and the current regulator 5 despite the restriction of the output voltage 9 of the frequency converter 4. When the voltage reference 12 of the motor bridge in this case reaches the aforementioned maximum value 10 of the saw-tooth generator of the modulator comparator, the length |U| (horizontal dashed line) of the phasor of the voltage reference of the motor bridge is limited to the maximum value of the saw-tooth generator. In this case the stator current of the electric motor and at the same time the torque produced by the electric motor start to decrease; when the torque decreases, the speed 19 of the electric motor also starts to fall. When the speed of the electric motor falls, the source voltage of the rotor and thereby the supply voltage required by the electric motor also decreases, in which case the speed of the motor settles at the value determined by the output voltage of the motor bridge. At the time $t_3$ the voltage reduction of the supplying network starts to disappear, in which case the intermediate circuit voltage $U_{DC}$ starts to increase. At the time $t_4$ the voltage reference 12 of the motor bridge again returns to below the maximum value 10 of the saw-tooth generator of the modulator comparator. At the time $t_5$ the difference between the voltage reference 12 of the motor bridge and the permitted maximum value 10 of the voltage reference returns to be the magnitude of the required limit value 15, after which has occurred the control part 28 of the adjustment device 1 continues the interrupted operation of the speed regulator 8 and of the current regulator 5. After this the operation of the speed regulator 8 and likewise the setting of the initial value of the speed reference 18 and the calculation of the speed reference 18 continues as described above in connection with the first embodiment.

Presented above is how the output voltage 9 of the frequency converter 4 in relation to the permitted maximum value 10 of the output voltage is determined on the basis of the voltage reference 12 of the motor bridge of the frequency converter; the determination could, however, also be done e.g. by measuring the intermediate circuit voltage $U_{DC}$ of the frequency converter and also the output voltage 9 of the frequency converter and by further deducing when the output voltage 9 of the frequency converter reaches the maximum value of the output voltage that is determined on the basis of the intermediate circuit voltage $U_{DC}$.

The invention is not only limited to be applied to the embodiments described above, but instead many variations are possible within the scope of the inventive concept defined by the claims below.

The invention claimed is:

1. Adjustment device in connection with an electric drive of an elevator,
    which electric drive of an elevator comprises an electric motor;
    and which electric drive of an elevator comprises a power supply apparatus of an electric motor for adjusting the supply voltage of an electric motor;
    and which adjustment device comprises means for controlling a power supply apparatus of an electric motor;
    and which adjustment device comprises a speed regulator for adjusting the speed of the electric motor;
    wherein the adjustment device is arranged to determine the output voltage of the power supply apparatus of the electric motor in relation to the permitted maximum value of the output voltage, and in that the adjustment device is arranged to interrupt the operation of the speed regulator but to continue the operation of the power supply apparatus of the electric motor when the output voltage of the power supply apparatus of the electric motor reaches the permitted maximum value.

2. Adjustment device according to claim 1, wherein the adjustment device is arranged to continue the interrupted operation of the speed regulator when the difference between the output voltage of the power supply apparatus of the electric motor and the permitted maximum value of the output voltage returns to be at least the magnitude of the required limit value.

3. Adjustment device according to claim 1, wherein the power supply apparatus of the electric motor comprises a motor bridge, which comprises controllable solid-state switches, which are switched in response to the voltage reference of the motor bridge, and in that the adjustment device is arranged to determine the output voltage of the power supply apparatus of the electric motor in relation to the permitted maximum value of the output voltage on the basis of the voltage reference of the motor bridge of the power supply apparatus of the electric motor.

4. Adjustment device according to claim 3, wherein the adjustment device is arranged to interrupt the operation of the speed regulator but to continue the operation of the power supply apparatus of the electric motor when the voltage reference of the motor bridge of the power supply apparatus of the electric motor reaches the permitted maximum value.

5. Adjustment device according to claim 4, wherein the adjustment device is arranged to limit the length of the phasor of the voltage reference vector of the motor bridge of the power supply apparatus of the electric motor to the value for the length of the phasor set by the permitted maximum value of the voltage reference of the motor bridge of the power supply apparatus of the electric motor.

6. Adjustment device according to claim 3, wherein the adjustment device is arranged to continue the interrupted operation of the speed regulator when the difference between the voltage reference of the motor bridge of the power supply apparatus of the electric motor and the permitted maximum value of the voltage reference returns to be at least the magnitude of the required limit value.

7. Adjustment device according to claim 4, wherein the aforementioned permitted maximum value of the voltage reference is determined on the basis of the maximum value of the modulator comparator of the adjustment device.

8. Adjustment device according to claim 2, wherein the speed regulator is arranged to adjust the speed of the electric motor towards the value of the speed reference, and in that the speed regulator is arranged to set the initial value of the speed reference to correspond to the speed of the electric motor when the interrupted operation of the speed regulator continues.

9. Adjustment device according to claim 1, wherein the adjustment device is arranged to keep the value of at least one adjustment parameter of the power supply apparatus of the electric motor constant after the operation of the speed regulator has been interrupted.

10. Adjustment device according to claim 9, wherein the adjustment device comprises a current regulator for adjusting the current of the electric motor, and in that the aforementioned adjustment parameter of the power supply apparatus of the electric motor to be held constant is the current reference of the current regulator.

11. Adjustment device according to claim 9, wherein the adjustment device comprises a voltage regulator for adjusting the output voltage of the power supply apparatus of the electric motor, and in that the aforementioned adjustment parameter of the power supply apparatus of the electric motor to be held constant is the voltage reference of the voltage regulator.

12. Adjustment device according to claim 9, wherein the adjustment device is arranged to set the aforementioned adjustment parameter of the power supply apparatus of the electric motor, which parameter is to be held constant after the operation of the speed regulator has been interrupted, to correspond to the value of the adjustment parameter in question when the operation of the speed regulator is interrupted.

13. Adjustment device according to claim 1, characterized in that wherein the adjustment device is arranged to adjust the current of the electric motor towards the value of the current reference for adjusting the torque of the electric motor.

14. Electric drive of an elevator, which electric drive comprises a hoisting machine, which hoisting machine comprises an electric motor;
and which electric drive of an elevator comprises a power supply apparatus of the electric motor;
wherein the electric drive of the elevator comprises an adjustment device according to claim 1 for controlling the electric drive of the elevator, and in that the electric drive of the elevator is arranged to continue the current supply occurring to the electric motor with the power supply apparatus of the electric motor when the output voltage of the power supply apparatus of the electric motor reaches the permitted maximum value.

15. Electric drive of an elevator according to claim 14, wherein the power supply apparatus of an electric motor is a frequency converter.

16. Electric drive of an elevator according to claim 14, wherein the electric motor is a permanent-magnet synchronous motor.

17. Electric drive of an elevator according to claim 14, wherein the adjustment device is arranged to interrupt the operation of the speed regulator but to continue the current supply to the stator of the electric motor when the output voltage of the power supply apparatus of the electric motor reaches the permitted maximum value.

18. Method for controlling an electric drive of an elevator, wherein:
the output voltage of the power supply apparatus of the electric motor in relation to the permitted maximum value of the output voltage is determined
the operation of the speed regulator is interrupted but the operation of the power supply apparatus of the electric motor is continued when the output voltage of the power supply apparatus reaches the permitted maximum value.

19. Method according to claim 18, wherein:
the interrupted operation of the speed regulator is continued when the difference between the output voltage of the power supply apparatus of the electric motor and the permitted maximum value of the output voltage returns to be at least the magnitude of the required limit value.

20. Method according to claim 19, wherein:
the initial value of the speed reference is set to correspond to the speed of the electric motor, when the interrupted operation of the speed regulator continues.

\* \* \* \* \*